UNITED STATES PATENT OFFICE.

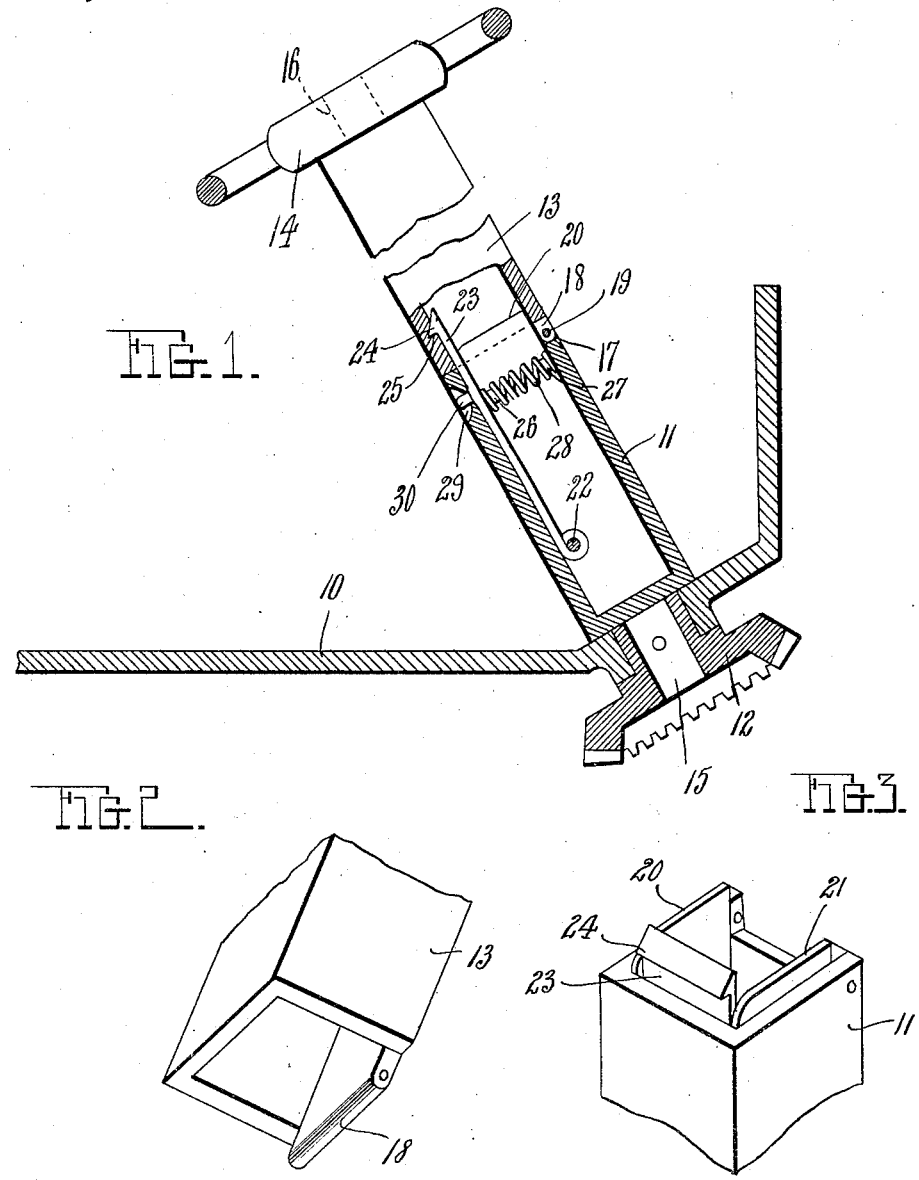

CHARLES T. KOENIGSBERG AND HENRY KOENIGSBERG, SR., OF HOLLAND, MICHIGAN.

AUTOMOBILE STEERING-POST.

No. 918,166.  Specification of Letters Patent.  Patented April 13, 1909.

Application filed May 9, 1908. Serial No. 431,855.

*To all whom it may concern:*

Be it known that we, CHARLES T. KOENIGSBERG and HENRY KOENIGSBERG, Sr., citizens of the United States, residing at Holland, in the county of Ottawa, State of Michigan, have invented certain new and useful Improvements in Automobile Steering-Posts; and we do hereby declare the following to be a full, clear, and exact description of the invention, such as will enable others skilled in the art to which it appertains to make and use the same.

This invention relates to the steering posts of automobiles, and has for one of its objects to improve the construction and to increase the efficiency and utility of devices of this character.

Another object of the invention is to produce a device of this character having a strongly constructed and durable intermediate joint, which enables the rod to be turned laterally when not in use, when repairs are to be made, or to enable the operator to enter or leave the vehicle.

With these and other objects in view the invention consists in certain novel features of construction as hereafter shown and described and then specifically pointed out in the claims, and in the drawings illustrating the preferred embodiment of the invention, Figure 1 is in part a side elevation and in part a vertical section of a portion of an automobile with the improved device applied. Fig. 2 is a perspective view from below of the lower portion of the upper rod section. Fig. 3 is a perspective view from above of the upper portion of the lower rod section.

The improved device may be applied to any of the various automobiles in use without material structural changes, and in the drawings is shown applied to a conventional form of a vehicle of this class, the body of the vehicle being represented at 10.

The improved steering rod is constructed in two sections, a lower section 11 coupled at the lower end to the steering mechanism, a portion of which is represented at 12, and an upper section 13 to the upper end of which the steering wheel 14 is secured. The sections 11—13 are formed from square metal tubes preferably of steel with studs 15—16 at the ends to enable them to be connected respectively to the steering mechanism and to the steering wheel.

The lower section 11 is provided with a recess 17 in its upper edge at one side and the upper section 13 is provided with a projection 18 from its lower edge at the corresponding side and closely fitting the recess of the lower section. A pin 19 extends through the sides of the lower rod section 11 opposite the recess and likewise through the projection of the upper rod section, the parts being thus hingedly united, with the hinge elements also serving as an effectual means for preventing lateral movement between the sections. The lower section 11 is also provided with upwardly extending wings 20—21 over which the upper section 13 engages when closed, and serving to prevent lateral displacement of the sections, in coöperation with the projection 18 and recess 17.

Swinging at 22 within the lower section 11 at the side opposite to the recess 17 is a catch device 23 extending at the upper end above the lower section and provided with an outward projection 24 engaging in a cavity 25 in the upper section 13, and thus forming a locking means between the sections when closed. The member 23 is provided with a boss 26 and the opposite wall of the lower rod section 11 is provided with a similar boss 27, the bosses supporting a spring 28 operating to maintain the member 23 yieldably in locked position.

The lower rod section 11 is provided with an aperture 29 opposite the member 23 and the latter is provided with a stud or push button 30 extending through the aperture, to enable the member 23 to be released when the joint is to be "broken." By this simple means a very strong and rigid joint is provided for the steering rod, which will effectually resist all the severe strains to which it will be subjected, while at the same time very readily "broken" at the joint by simply pressing the button 30. The upper portion of the rod may thus be turned forwardly toward the hood out of the way when the operator enters or leaves the vehicle, or turned down rearwardly, or away from the hood when required for any purposes, for instance when repairs are to be made and when free access to the hood is required.

The device is simple in construction, can be inexpensively manufactured, and operates effectually for the purposes described.

What is claimed, is:—

A steering rod for automobiles comprising an upper and a lower section of square tubular metal with the lower section adapted to be connected to the steering means and the upper section carrying the steering wheel, a recess in the confronting end of one section and a projection extending from the other section into the recess, a pin extending through the projection and likewise through the adjacent walls of the section to form a combined hinge and stay, wings projecting from one of the sections and extending into the other section, a member swinging within one of the sections and extending into the other section and provided with a lateral projection engaging a cavity in said other section, a spring operating to maintain the swinging member yieldably engaged, and a stud extending from the swinging member through the adjacent wall of the section in which it is disposed.

In testimony whereof we affix our signatures, in presence of two witnesses.

CHARLES T. KOENIGSBERG.
HENRY KOENIGSBERG, Sr.

Witnesses:
CHARLES H. McBRIDE,
H. A. NABERHINS.